United States Patent Office

2,786,795
Patented Mar. 26, 1957

2,786,795

FUNGICIDAL TRICHLORODINITROBENZENE COMPOSITIONS AND METHODS OF MANUFACTURING AND USING SAME

Waldo B. Ligett, Pontiac, Calvin N. Wolf, Detroit, and Harry R. Dittmar, Royal Oak, Mich., assignors to Ethyl Corporation, New York, N. Y., a corporation of Delaware No Drawing. Continuation of abandoned application Serial No. 244,568, August 31, 1951. This application September 5, 1952, Serial No. 308,171

9 Claims. (Cl. 167—30)

This invention relates to a novel biocidal and bioregulant material and synergistic compositions thereof. This application is a continuation of co-pending application Serial No. 244,568, filed August 31, 1951, now abandoned.

Among the materials which have received commercial attention as biocidal or bioregulant agents it has been found that organic materials have a combination of properties which render them superior to the inorganic salt-like materials previously used. Among such properties are increased resistance to weathering, a property related to low water solubility or resistance to hydrolysis. Furthermore, the inorganic materials previously considered have many secondary disadvantages. For example, for agricultural and similar applications, high toxicity to warm blooded animals and humans limits their usefulness on food crops. In addition secondary effects such as burning of leafy plants and soil sterilization are often encountered.

One such organic material which has had limited utility as a fungicide is 1,2,4-trichloro-3,5-dinitrobenzene. This material has been given limited acceptance as a commercial fungicide but has certain disadvantages. The trichlorobenzene from which this material is produced by dinitration is presently produced only as a co-product with other chlorinated benzenes, requiring expensive separation and purification procedures to yield a product of adequate purity for manufacture of such fungicidal trichlorodinitrobenzene.

In recent years much attention has been given to developing chemical agents which alter life processes. These have found widespread use in agricultural and pest control applications. Control of fungi is only one manifestation of altering or controlling life processes. Other examples include insecticidal and herbicidal applications. Materials capable of performing these functions we refer to as bioregulants or biocides.

It is an object of our invention therefore to provide an organic material which is extremely effective at low concentration in a wide variety of biocidal or bioregulant applications. It is a further object of our invention to provide a fungicidal composition which has wide utility in protecting various materials from attack by fungus organisms. Likewise, it is an object of our invention to provide synergistic fungicidal compositions of heightened potency. Further, we provide materials possessing selective herbicidal activity and insecticidal potency. A further object of our invention is to provide an organic bioregulant which can be manufactured directly and economically from available raw materials. Other objects will be apparent in the further discussion hereinafter.

We have discovered that the material 1,2,3-trichloro-4,6-dinitrobenzene is an extremely potent fungicide of a higher order of reactivity than the isomeric material 1,2,4-trichloro-3,5-dinitrobenzene. Furthermore, this high fungicidal activity of the former is not reduced upon admixture with large amounts of the latter. The pure compound 1,2,3-trichloro-4,6-dinitrobenzene is of the order of 2,000 percent more effective as a fungicide than the pure 1,2,4-trichloro-3,5-dinitrobenzene isomeric therewith. However, mixtures of the two materials containing as much as 95 weight percent of the less active isomer surprisingly exhibit practically the same high activity as 100 percent of the more potent isomer. In other words, 1,2,3-trichloro-4,6-dinitrobenzene not only is a fungicidal material of high potency in itself but exerts a synergistic fungicidal effect on the isomer 1,2,4-trichloro-3,5-dinitrobenzene.

Our trichlorodinitrobenzene also exhibits selective herbicidal activity of a form not heretofore encountered, so far as we are aware, in the art of bioregulation.

The most direct method of manufacturing a trichlorodinitrobenzene is by dinitration of the corresponding trichlorobenzenes. However, direct methods of synthesis of trichlorobenzenes do not provide a significant proportion of the desired 1,2,3-trichlorobenzene, and further are accompanied by excessive proportions of lower and higher chlorinated benzenes.

One method of manufacturing trichlorobenzenes comprises the dehydrochlorination of 1,2,3,4,5,6-hexachlorocyclohexane, commonly referred to as benzene hexachloride. The trichlorobenzenes produced thereby ordinarily contain 1,2,4-trichlorobenzene and 1,2,3-trichlorobenzene in proportions of about three to one parts by weight, respectively. We have found that by treating such mixtures under conditions whereby dinitration occurs we obtain fungicidal compositions which are equally effective as the 1,2,3-trichloro-4,6-dinitrobenzene and much greater in effectiveness than the 1,2,4-trichloro-3,5-dinitrobenzene alone.

Recently benzene hexachloride has become an important article of commerce as an insecticide. Crude benzene hexachloride consists of a mixture of a number of isomers of 1,2,3,4,5,6-hexachlorocyclohexane, only one of which, the gamma isomer, is significantly active as an insecticide. Therefore, a preferred method of obtaining our trichlorodinitrobenzene composition is first to remove the insecticidally-active and therefore valuable gamma isomer of benzene hexachloride and to dehydrochlorinate the resulting gamma-poor benzene hexachloride to trichlorobenzene, followed by dinitration. Thus crude benzene hexachloride can thereby yield both a highly potent insecticide and an extremely potent bioregulant.

We have found, however, that it is not necessary to limit the manufacture of our material to the methods outlined above. We have found that mixtures of the substantially pure compounds 1,2,4-trichloro-3,5-dinitrobenzene and 1,2,3-trichloro-4,6-dinitrobenzene in the concentration limits pointed out in the foregoing provide materials equally effective as fungicides or bioregulants. Thus, for example, we can provide the synergistic fungicidal trichlorodinitrobenzenes of our invention by the substitution chlorination of benzene, submitting that fraction comprising predominantly trichlorobenzene to dinitration and adding thereto synergistic proportions of 1,2,3-trichloro-4,6-dinitrobenzene.

The following specific examples of methods of manufacturing our trichlorodinitrobenzene fungicides will serve as illustrations. In these and other examples hereinafter all parts and percentages are by weight.

EXAMPLE I

To a reaction vessel equipped with an agitator, a reflux condenser, a temperature gauge, and means for introducing liquid reactants was charged 525 parts of 18/80 mixed nitric and sulfuric acids. The acid mixture was warmed to 35° C., and 90.7 parts of chlorobenzenes obtained by thermal dehydrochlorination of technical benzene hexachloride was added over a period of 30 minutes with vigorous agitation. This cracked technical benzene hexachloride contained 91 percent trichlorobenzenes in a weight ratio of 2.78 of the 1,2,4-trichlorobenzene to 1 part of the 1,2,3-trichlorobenzene. The temperature was gradually raised to 95–103° C., during the addition, and was maintained at 110° C. for six and one-half hours. The mixture was then cooled to 20° C., with stirring being maintained. The reaction product, in the form of solid pellets, was collected on a filter, using a glass filter medium. The crude product was washed, with cold water, boiling water, dilute bicarbonate solution, and finally with cold water. After drying, the yield of pale yellow crystals was 129.3 parts having a setting point of 80.6° C. and a chlorine content of 40.3 percent. This product contained 1,2,4-trichloro-3,5-dinitrobenzene and 1,2,3-trichloro-4,6-dinitrobenzene in the weight ratio of 2.8 to 1.

EXAMPLE II

Benzene hexachloride from which the insecticidally active gamma isomer had been substantially removed by fractional extraction procedures was thermally dehydrochlorinated by the method of French Patent 955,816 to produce a product containing 93.4 weight percent trichlorobenzenes in the ratio of 2.9 parts of 1,2,4-trichlorobenzene to 1 part of 1,2,3-trichlorobenzene. A total of 90.7 parts of this trichlorobenzene mixture was dinitrated by the same procedure as described in Example I. The yield of pale yellow crystals was 126.1 parts having a setting point of 85.3° C. and a chlorine content of 39.5 percent. This mixture contained 1,2,4-trichloro-3,5-dinitrobenzene and 1,2,3-trichloro-4,6-dinitrobenzene in a weight ratio of 2.9 to 1 respectively.

EXAMPLE III 1,2,3-trichloro-4,6-dinitrobenzene was prepared by the procedure described for Example I, using a charge of 262.1 parts of 18/80 mixed nitric and sulfuric acids and 45.4 parts of 1,2,3-trichlorobenzene. The yield of pale yellow crystals was 65.7 parts (96.8 percent), melting at 93–94° C. After recrystallization from ethanol, the product melted at 94–94.5° C. Anal. calcd. for $C_6HN_2O_4Cl_3$: Cl, 39.2; N, 10.3. Found: Cl, 39.5; N, 10.4.

EXAMPLE IV

The trichlorobenzene fraction of the cracked benzene hexachloride employed in Example I was isolated by rectification and found, by spectroscopic analysis, to consist of 26.7 percent of 1,2,3-trichlorobenzene and 73.3 percent of 1,2,4-trichlorobenzene. This material was dinitrated by the procedure of Example I. The yield of pale yellow crystals was 129.3 parts (95.3 percent), having a setting point of 84.8° C. and a chlorine content of 39.2 percent. This material contained 1,2,3-trichloro-4,6-dinitrobenzene and 1,2,4-trichloro-3,5-dinitrobenzene in the amount of 26.7 percent and 73.3 percent respectively.

EXAMPLE V

The trichlorobenzene fraction of the dehydrochlorinated, gamma-free, benzene hexachloride of Example II, consisting of 25.5 percent of the 1,2,3-isomer and 74.5 percent of the 1,2,4-isomer was dinitrated as in Example I. The yield of nearly white crystals was 130.2 parts (95.9 percent), having a setting point of 87.2° C. and a chlorine content of 39.4 percent. This material contained 1,2,3-trichloro-4,6-dinitrobenzene and 1,2,4-trichloro-3,5-dinitrobenzene in the amount of 25.5 percent and 74.5 percent respectively.

EXAMPLE VI

A synthetic mixture of one part of 1,2,3-trichloro-4,6-dinitrobenzene to one part of 1,2,4-trichloro-3,5-dinitrobenzene was prepared by dissolving together one part of each compound in 30 parts of acetone, boiling off the acetone, and quickly crystallizing the residual oil by submitting it to a partial vacuum. This mixture of crystals was then broken up and finely ground.

EXAMPLE VII

A synthetic mixture of 12 parts of 1,2,4-trichloro-3,5-dinitrobenzene to one part of 1,2,3-trichloro-4,6-dinitrobenzene was prepared by the procedure of Example VI.

EXAMPLE VIII

A synthetic mixture of 20 parts of 1,2,4-trichloro-3,5-dinitrobenzene to one part of 1,2,3-trichloro-4,6-dinitrobenzene was prepared by the procedure of Example VI.

One method of applying our materials is in the form of a water suspension, wherein a surface-active agent has been incorporated in sufficient amount to disperse and suspend the fungicide. Examples of such surface-active agents which can be employed in forming dispersions include salts of the alkyl and alkylaryl sulfonates such as Du Pont MP–189 and Nacconol-NR, alkyl sulfates such as Dreft, alkylamide sulfonates such as Igepon-T, the alkylaryl polyether alcohols such as Triton X–100, the fatty acid esters of polyhydric alcohols such as Span, the ethylene oxide addition products of such esters, as for example Tween, and the addition products of long-chain mercaptans and ethylene oxide, such as Sharples' Non-Ionic-218. Still other surface-active agents can be employed, the above merely showing a representative list of the more common materials.

EXAMPLE IX

The 1,2,3-trichloro-4,6-dinitrobenzene, prepared as in Example III, was ground so as to pass a 100-mesh screen. One hundred parts of this powder was agitated with 10,000 parts of water containing 1 part of Tween-80. Ten parts of this permanent suspension was further diluted with 10,000 parts of water to obtain a dispersion containing 10 p. p. m. of active material.

Similar suspensions were made of the materials produced in Example I, II and IV through VIII above with equally good results.

The solubility of our compositions in inorganic solvents, furthermore, is such that they can be applied advantageously in the form of solutions in this type of solvent, and for certain uses this method of application is preferred. For example, to protect cloth, leather or other fibrous articles from fungus attack, it may be desirable to apply our fungicides dissolved in a volatile solvent. After use the volatile solvent evaporates leaving the fungicide impregnated throughout the surface of the article. Likewise, in applying our fungicides to smooth surfaces, as for example in treating wood surfaces for protection against fungus attack, a solution may be the most practical method for applying a protective film by brushing, spraying or dipping. The choice of an appropriate solvent is determined largely by the concentration of active ingredient which it is desired to employ, by the volatility required in a solvent, the spreading or flow characteristics thereof, and by the nature of the material being treated. Among the many organic solvents which can be employed as the carrier for our fungicides we can employ hydrocarbons such as benzene or toluene, ketones such as acetone and methylethyl ketone, chlorinated solvents such as carbon tetrachloride, trichloro- and perchloroethylene, and esters such as ethyl, butyl and amyl acetates, and alcohols such as ethanol, isopropanol and amyl alcohols. Among the solvents which we prefer to employ are the carbitols and cellosolves, the former comprising in general the monoalkyl ethers of diethylene glycol and the latter the monoalkyl ethers of ethylene glycol. In addition, combinations of these various typical solvents can be employed whereby special volatility and viscosity characteristics can be imparted to our formulations.

EXAMPLE X

Ten parts of the mixture of 1,2,3-trichloro-4,6-dinitrotural crops against fungus diseases is the susceptibility of the plant to damage by the fungitoxicant employed. Our materials are particularly advantageous in this respect since in a variety of tests we have found no evidence that our materials are toxic to plants or inhibit in any way the normal functioning of the plant or the germination of seeds. We have demonstrated the innocuous nature of our fungitoxicants by dipping the entire leaf of tomato plants in suspensions of our fungicides at concentrations as high as 2,000 p. p. m. and have observed no effect on the so-treated plants or upon the leaves which were dipped.

The effectiveness of our fungicides in protecting growing plants from fungus diseases has been demonstrated by control of the tomato late blight, a disease prevalent in both tomato and potato, and which produces decay of the leaves, stem and tubers. This test involves spraying the test plants with a 0.2 percent concentration of the fungicide, innoculation with spores of *Phytophthora infestans*, and determination of the number of disease lesions which develop. Bonny Best tomato plants grown in three-inch pots to a height of 4–7 inches were used as host plants. Three replicate plants were used for each compound. The 0.2 percent spray suspensions of the compounds were made up in 0.01 percent Tween-80 solutions in all cases. The tomato plants were sprayed on a revolving turntable with the fungicide suspension by means of a De Vilbiss paint spray gun. Each turntable load of plants was sprayed with 85 cc. of spray suspension. No appreciable loss of fungicide from the plants because of run-off occurs under these conditions. Under the standard conditions used, a deposit of approximately 0.0015 gm. of fungicide per 100 cm.$^2$ of total leaf area (i. e., including upper and lower leaf surfaces) is obtained. After the fungicide deposit was allowed to dry, the plants were innoculated with a spore suspension of the fungus. The spores were obtained from fungus cultures grown on salt potato dextrose agar at 20° C. for 7–14 days. Twenty cc. of a suspension containing 50,000 spores per cc. was used to innoculate each turntable load of plants. The spores were sprayed under an air pressure of 10 p. s. i. by means of a De Vilbiss atomizer held about one foot from the plants. Both the upper and lower leaf surfaces were uniformly innoculated by this method. Following innoculation, the plants were placed in an infection chamber which was maintained at 20° C. and 100 percent relative humidity. After 40–48 hours in this chamber, the plants were removed to a greenhouse bench. Lesions usually developed 3 to 4 days after innoculation. The total number of late blight lesions on three compound leaves of each sprayed plant were determined. Leaves having the same position on the plant were counted for all treatments and the controls. The disease index was obtained by dividing the average number of lesions per replicate sprayed plant by the average number of lesions per control plant. For this purpose a number of young tomato plants were infected but not treated with a protective agent. This test is further described by Wellman and McCallan, Contrib. Boyce Thompson Inst., 13, 171 (1943).

Table II

| No. | Compound | Disease Index—percent no. of lesions compared to untreated plants (Tomato Late Blight) |
| --- | --- | --- |
| 1 | 1,2,3-Trichloro-4,6-dinitrobenzene | 0.0 |
| 2 | {70% 1,2,4-Trichloro-3,5-dinitrobenzene<br>30% 1,2,3-Trichloro-4,6-dinitrobenzene} | 2.0 |
| 3 | {74.5% 1,2,4-Trichloro-3,5-dinitrobenzene<br>25.5% 1,2,3-Trichloro-4,6-dinitrobenzene} | 0.0 |
| 4 | 1,2,4-Trichloro-3,5-dinitrobenzene | 40 |
| 5 | Control (untreated) | 100 |

It is apparent from considering the data presented in Table II that the previously-known fungicidal material, 1,2,4-trichloro-3,5-dinitrobenzene, was ineffective in preventing the tomato late blight. However, complete control was obtained by employing our bioregulant, 1,2,3-trichloro-4,6-dinitrobenzene. Furthermore, by substituting up to 75 percent of our effective material by this ineffective isomer the same high level of disease control was maintained. Thus, a true synergistic effect exists wherein the net result of combining the two materials produces a more than additive effect as determined by the effectiveness of each material alone. Furthermore, throughout the range of proportions of the two materials within the scope of our invention essentially complete control of tomato late blight was obtained.

An important application of selective herbicidal activity resides in controlling weeds before emergence. Pre-emergence weed control has many advantages over control after the undesirable weeds have made an appearance and are co-present with the agricultural crop. To demonstrate this example of selective bioregulant properties of our compositions we conducted a seed germination determination as follows. Seeds were placed on a filter paper in a Petri dish moistened with 5 ml. of an aqueous suspension of the bioregulant prepared as in Example XII. The closed Petri dish was then incubated at constant temperature for five days and the percent germination at the end of this time was noted. By this method we determined that at a total concentration of 0.1 percent mixtures of 1,2,3-trichloro-4,6-dinitrobenzene containing 75 percent 1,2,4-trichloro-3,5-dinitrobenzene completely prevented the germination of rye grass seed while permitting 87 percent germination of radish seed. Furthermore, at a concentration of 0.01 percent 1,2,3-trichloro-4,6-dinitrobenzene permitted only 8 percent germination of rye grass but 100 percent germination of radish seed. In contrast to this selective behavior, the material 1,2,4-trichloro-3,5-dinitrobenzene did not inhibit germination of either rye grass or radish seeds. Thus, by our invention we have obtained control of the so-called narrow leaf plants without interfering with the life process of the broad leaf plants. This behavior is a reversal of the customary action of known selective herbicides.

The materials of our invention possess unusual insecticidal activity. We have demonstrated this property by treating the adult German roach with a dust formulation of our materials prepared as in Example XIV. At a concentration of 2,000 p. p. m., 100 percent mortality was achieved by subjecting the German roach to dust formulations of 1,2,3-trichloro-4,6-dinitrobenzene, a mixture comprising 70 percent 1,2,4-trichloro-3,5-dinitrobenzene and 30 percent 1,2,3-trichloro-4,6-dinitrobenzene, or a mixture of 75 percent 1,2,4-trichloro-3,5-dinitrobenzene and 25 percent 1,2,3-trichloro-4,6-dinitrobenzene. When German roaches were similarly treated with a dust formulation of 1,2,4-trichloro-3,5-dinitrobenzene at a concentration of 10,000 p. p. m. the mortality achieved was only 30 percent. Thus, the 1,2,3-trichloro-4,6-dinitrobenzene of our invention is three times as effective at one-fifth the concentration as the 1,2,4-trichloro-4,6-dinitrobenzene, and this high mortality level is maintained when 70 percent of the 1,2,3-trichloro-4,6-dinitrobenzene is replaced by this less active isomer.

The effective concentration of the bioregulants of our invention depend in general upon the material to which application is made and upon the conditions encountered in use. Thus, our materials are effective in concentrations ranging from about .01 p. p. m. to 10,000 p. p. m.; that is, up to about 10 percent by weight, with the balance of the composition composed of a fungicidally inert adjuvant as a carrier therefor. However, we prefer to employ concentrations of the active ingredient of our bioregulant compositions between about .01 and 2,000 p. p. m.; that is, up to about 2 percent by weight.

In those embodiments of our invention wherein 1,2,4- benzene and 1,2,4-trichloro-3,5-dinitrobenzene, as prepared in Example I above, was agitated with 990 parts of kerosene at a temperature of 25° C. for a period of one-half hour. Of the resulting solution, 10 parts was further diluted with 1,000 parts of acetone to give a final solution suitable for applications containing 100 p. p. m. of the active synergistic bioregulant ingredient.

When each of the products prepared as in the Examples I throughout VIII above were treated with each of the following solvents—trichloroethylene, perchloroethylene, amyl acetate, ethanol, cellosolve, and toluene—solutions of equal applicability were obtained.

In addition to the above-described methods of wet application of our trichlorodinitrobenzenes, we can prepare compositions in which our materials are extended in talc, clay or other solid diluents. Such formulations have particular utility in the treatment of seeds, for preemergence weed control wherein an aqueous application may promote premature germination, or where a solvent application may damage the seed. For certain field crop applications we also prefer a dust formulation wherein a wet application might introduce certain secondary effects which are undesirable. Further specific examples of such typical inert solid carriers which can be employed as diluents in our dust formulations include fuller's earth, pyrophillite, Attaclay and the Filtrols.

EXAMPLE XI

The product, one part, obtained in Example II above, was treated, along with 0.01 part of Tween-80, in a hammer mill with 10,000 parts of fuller's earth. The resulting uniform powder was screened to pass a 100-mesh sieve to provide a powder formulation which can be directly applied to agricultural crops.

Each of the materials produced in Examples I through VIII above were similarly treated with fuller's earth, pyrophillite, and Filtrol containing one-tenth percent Nacconol with equally good results. When the dust formulations containing the Nacconol were added to water, immediate dispersions suitable for direct application are obtained.

For certain applications we prefer to employ our materials in the form of oil-in-water emulsions. Thus, a concentrate of the fungicidal or bioregulant agent is prepared in a water-insoluble solvent and this solution is then dispersed or emulsified in water containing a surface-active agent. Typical examples of such solvents include hydrocarbons such as kerosene, benzene or naphtha, higher alcohols such as butanol, oleyl alcohol or ethers and esters thereof, and chlorinated solvents such as perchloroethylene and trichloroethylene.

EXAMPLE XII

An oil-in-water emulsion was prepared by dissolving 10 parts of the synergist product of Example IX in 1,000 parts of kerosene. This solution was dispersed with vigorous agitation in 1,000 parts of water containing 1 part of Triton X-100, to provide a dispersion containing 10 p. p. m. of active agent.

Further, we have discovered that it is possible to employ a combination of the above methods of application of our compositions. Thus, we can incorporate a surface-active agent in our dust formulations to provide a wettable powder, which can then be suspended in an aqeous or other liquid medium. Of particular utility for such formulations are the alkyl or alkylaryl sulfonate detergents.

EXAMPLE XIII

A mixture of 10 parts of the product of Example VI, 1,000 parts of Attaclay and 0.1 part of Nacconol was milled through a hammer mill and the resulting powder sieved to pass a 100-mesh screen. This wettable powder produced a satisfactory water suspension when 100 parts were stirred into 1,000 parts of water. Similar wettable powders with Filtrol, fuller's earth and pyrophillite are prepared by milling as above.

Likewise, a solvent formulation can be employed along with water, or water and a surface-active agent. Such surface-active agents are chosen, for example, from the types represented by Triton X-100, Sharples' Non-Ionic-218 or Tween.

EXAMPLE XIV

A solution of 1 part of the synergistic product of Example VII, 100 parts of ethyl acetate and 0.1 part of Tween was prepared by stirring the ingredients at 25° C. for one-half hour. This solution was then added with agitation to 9,900 parts of water to provide a dispersion suitable for application.

Equally good dispersions are obtained when the products of Examples I through VIII are dissolved in methanol, acetone, and methyl ethyl ketone along with Triton X-100 and added with agitation to water.

In addition, we have found that we can incorporate an adherent or sticking agent such as vegetable oils, naturally occurring gums, and other adhesives. Likewise, we can employ humectants in our formulations. Furthermore, these formulations can be employed in admixture with other fungicidal materials or other biocides such as insecticides, larvicides, bactericides, vermicides, miticides, or with other materials which it is desired to apply along with our compositions, such as for example fertilizers.

To demonstrate the utility of our trichlorodinitrobenzenes as fungicides we determined the concentration at which the germination of 50 percent of the spores of each of the fungi *Alternaria oleracea* and *Sclerotinia fructicola* is inhibited. The former is responsible for the potato blight, while the latter causes peach rot. These fungi are representative of fungus types which are responsible for heavy crop damage. The ability to control these fungi is a reliable indication of the general applicability of our fungicides to protect important agricultural crops. These tests were conducted as follows: 100 parts of the active ingredient was triturated with 1,000 parts of distilled water containing one part of the commercial dispersant Triton X-100. This standard suspension was thereupon further diluted with distilled water and the concentration at which one-half of the fungi contained in a drop of water on a microscope slide were prevented from sporulating was determined. This standard slide-germination method is described and accepted by the Committee on Standardization of Fungicidal Tests of the American Phytopathological Society in "Phytopathology," 33, 627 (1943). In the following table are listed typical results of these determinations.

Table I

| No. | Compound | Concentration (p. p. m.) to inhibit sporulation 50 percent | |
|---|---|---|---|
| | | A. oleracea | S. fructicola |
| 1 | 1,2,3-Trichloro-4,6-dinitrobenzene | 0.2 | 0.3 |
| 2 | 70% 1,2,4-Trichloro-3,5-dinitrobenzene / 30% 1,2,3-Trichloro-4,6-dinitrobenzene | 0.2 | 0.5 |
| 3 | 50% 1,2,4-Trichloro-3,5-dinitrobenzene / 50% 1,2,3-Trichloro-4,6-dinitrobenzene | 0.1 | 0.35 |
| 4 | 74.5% 1,2,4-Trichloro-3,5-dinitrobenzene / 25.5% 1,2,3-Trichloro-4,6-dinitrobenzene | 0.3 | 0.7 |
| 5 | 92% 1,2,4-Trichloro-3,5-dinitrobenzene / 8% 1,2,3-Trichloro-4,6-dinitrobenzene | 0.6 | 1.0 |
| 6 | 95% 1,2,4-Trichloro-3,5-dinitrobenzene / 5% 1,2,3-Trichloro-4,6-dinitrobenzene | 0.5 | 1.2 |
| 7 | 1,2,4-Trichloro-3,5-dinitrobenzene | 2.4 | 8.0 |

From the above results it is apparent that the compounds of our invention possess extreme potency toward fungus organisms and the synergistic effect of 1,2,3-trichloro-4,6-dinitrobenzene upon the relatively ineffective 1,2,4-trichloro-3,5-dinitrobenzene is equally apparent.

Of particular importance in the treatment of agricultrichloro-3,6-dinitrobenzene is employed along with the 1,2,3-trichloro-4,6-dinitrobenzene we can employ these materials in the proportions of as much as about 95 percent by weight of the former, although we prefer to employ about 60 to 80 percent.

Having described various embodiments of the novel synergistic trichlorodinitrobenzene fungicide of our invention and pointed out the utility to which this composition can be applied and having further pointed out methods of manufacturing our fungicides, we do not intend that our invention should be limited to the above-descriptive examples except as in the appended claims.

We claim:

1. A novel bioregulant composition consisting essentially of up to about 10 weight percent 1,2,3-trichloro-4,6-dinitrobenzene and a fungicidally inert adjuvant as a carrier therefor.

2. A new composition of matter consisting essentially of 1,2,3-trichloro-4,6-dinitrobenzene and up to about 95 weight percent 1,2,4-trichloro-3,5-dinitrobenzene.

3. A synergistic trichlorodinitrobenzene fungicide wherein the active ingredient consists essentially of the dinitration product of dehydrochlorinated benzene hexachloride, and wherein said active ingredient consists essentially of 1,2,3-trichloro-4,6-dinitrobenzene and up to about 95 weight percent 1,2,4-trichloro-3,5-dinitrobenzene.

4. The composition of claim 3 wherein the benzene hexachloride is substantially free of the gamma isomer.

5. The method of manufacturing a synergistic trichlorodinitrobenzene fungicide which comprises dinitrating a mixture of 1,2,3-trichlorobenzene and 1,2,4-trichlorobenzene, wherein said 1,2,3-trichlorobenzene is present in amount substantially less than 50 weight percent.

6. The method of bioregulation which comprises treating susceptible organisms with the composition of claim 2.

7. The method of preventing fungus growth on susceptible materials which comprises treating said materials with a fungicidal formulation of the composition of claim 2.

8. The method of claim 5 wherein said mixture of 1,2,3-trichlorobenzene and 1,2,4-trichlorobenzene is that obtained by thermal dehydrochlorination of technical benzene hexachloride.

9. The process of claim 5 wherein said mixture of 1,2,3-trichlorobenzene and 1,2,4-trichlorobenzene is that obtained by thermal dehydrochlorination of technical benzene hexachloride from which the insecticidally active gamma isomer has been substantially removed.

References Cited in the file of this patent

UNITED STATES PATENTS

| 1,330,074 | Heyden | Feb. 10, 1920 |
| 2,519,317 | Kolka et al. | Aug. 15, 1950 |

FOREIGN PATENTS

| 50,523 | Denmark | Aug. 12, 1935 |

OTHER REFERENCES

Huffer: Travaux Chimiques des Pays-Bas 1920, vol. 40, pp. 451–453.

Brown: Insect Control by Chemicals, New York, John Wiley, 1951, p. 103.

Nakazema et al.: 1950, Botyu Kagaku, "The Utilization of the Inactive Isomers of Benzene Hexachloride," vol. 15, p. 93.